(12) United States Patent  
Wich

(10) Patent No.: US 6,276,739 B1
(45) Date of Patent: Aug. 21, 2001

(54) SUB-ASSEMBLY FOR A MOTOR VEHICLE DASH BOARD AREA

(75) Inventor: Rolf Wich, Hainburg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/423,927

(22) PCT Filed: May 13, 1998

(86) PCT No.: PCT/EP98/02814

§ 371 Date: Nov. 12, 1999

§ 102(e) Date: Nov. 12, 1999

(87) PCT Pub. No.: WO98/52814

PCT Pub. Date: Nov. 26, 1998

(30) Foreign Application Priority Data

May 17, 1997 (DE) .............................................. 197 20 902

(51) Int. Cl.⁷ .................................................... B60K 37/00
(52) U.S. Cl. ................ 296/72; 296/70; 296/194
(58) Field of Search .............................. 296/70, 72, 194, 296/203.02; 180/90; 280/779

(56) References Cited

U.S. PATENT DOCUMENTS

| 4,671,536 | 6/1987 | Yoshimura . |
| 5,037,130 | * 8/1991 | Okuyama ............................. 296/70 X |
| 5,238,286 | * 8/1993 | Tanaka et al. .......................... 296/70 |
| 5,593,001 | 1/1997 | Takano et al. . |
| 5,934,733 | * 8/1999 | Manwaring ............................. 296/72 |
| 5,934,744 | * 8/1999 | Jergens et al. ....................... 296/70 X |
| 6,062,626 | * 5/2000 | Bayer et al. ........................ 296/70 X |

FOREIGN PATENT DOCUMENTS

| 4232846 | 3/1994 | (DE) . |
| 19524175 | 7/1996 | (DE) . |
| 0546671 | 6/1993 | (EP) . |
| 0673829 | 9/1995 | (EP) . |

* cited by examiner

Primary Examiner—Joseph D. Pape
(74) Attorney, Agent, or Firm—Martin A. Farber

(57) ABSTRACT

An assembly for a cockpit area of a vehicle, in particular of a motor vehicle, having a cross member extending approximately over the width of a vehicle interior, the cross member having attachment points at its end regions for the connection to a vehicle cell and an attachment point which is eccentric to the vehicle longitudinal axis, for the connection to a steering column. In order to simplify the manufacture of the cockpit assembly and to reduce the wide variety of types of components used, the cross member and the attachment points form a constructional unit and that the external shape of the cross member and the attachment points for the connection to the vehicle cell and for the connection to the steering column are symmetrical to the longitudinal central plane of the cross member or are symmetrical to the geometrical central point of the cross member, which central point is situated on a parallel line to the vehicle longitudinal axis and perpendicularly above the longitudinal axis, the longitudinal central plane of the cross member being that plane which extends vertically and in the direction of the vehicle transverse axis and which intersects the geometrical central point of the cross member, which central point is situated on a parallel line to the vehicle longitudinal axis and perpendicularly above the longitudinal axis.

37 Claims, 4 Drawing Sheets

SUB-ASSEMBLY FOR A MOTOR VEHICLE DASH BOARD AREA

FIELD AND BACKGROUND OF THE INVENTION

The invention relates to an assembly for a cockpit area of a vehicle, in particular of a motor vehicle, having a cross member extending approximately over the width of a vehicle interior, the cross member having attachment points at its end regions for the connection to a vehicle cell and an attachment point which is eccentric to the vehicle longitudinal axis, for the connection to a steering column.

A cross member for a motor vehicle dashboard, which cross member extends over the width of the motor vehicle interior and has a mounting for a steering column screwed to its lower side, is known. This cross member consists of a plurality of extruded parts which are connected by welding. In conjunction with the steering column mounting which is to be screwed on, a cross member of this type is complex to produce and cannot be used for left-hand and right-hand drive vehicles without being modified.

SUMMARY OF THE INVENTION

In order to remedy this, the object of the present invention is to provide an assembly of the type mentioned for a cockpit area of a vehicle and having a cross member in such a manner that production is simplified and the wide variety of types of components used is reduced.

The object is achieved in the case of an assembly of the type mentioned in that the cross member and the attachment points form a constructional unit and in that the external shape of the cross member and the attachment points for the connection to the vehicle cell and for the connection to the steering column are symmetrical to the longitudinal central plane of the cross member, the steering central plane of the cross member being that plane which extends vertically and in the direction of the vehicle transverse axis and which intersects the geometrical central point of the cross member, which central point is situated on a parallel line to the vehicle longitudinal axis and perpendicularly above said longitudinal axis. Aside from a largely modular formation of the possibility of using standardized components, an assembly according to the invention offers the additional advantage that the cross member can be used, without structural modifications, both for left-hand drive vehicles and for those vehicles whose steering wheel is situated in the right half of the vehicle. For this purpose, the cross member is installed into the vehicle in such a manner that its geometrical central point is situated perpendicularly above the vehicle longitudinal axis. The vehicle longitudinal axis is the vehicle central axis which runs in the direction of the longitudinal extent of the vehicle. Perpendicularly thereto and in a plane which is parallel to the plane through the vehicle vertical points, the vehicle has a transverse axis. The point of intersection of the vehicle longitudinal axis and the vehicle transverse axis define the point of origin of the system of coordinates of the vehicle. The third axis of this spatial system of coordinates is described as the vehicle vertical axis. By virtue of the symmetry of the cross member and also of the most important attachment points to the longitudinal central plane of the cross member, i.e. a plane which is parallel to the plane of the vehicle vertical and transverse axis and which contains the longitudinal central axis of the cross member, which longitudinal central axis runs in the direction of the vehicle transverse axis, the cross member, by being installed rotated through 180° at the vertical axis, is suitable for use both in left-hand and also in right-hand drive vehicles. As a result, the assembly is simplified and also the number of components to be supplied is reduced.

Alternatively, the object on which the invention is based is achieved in that the cross member and the attachment points form a constructional unit and in that the external shape of the cross member and the attachment points for the connection to the vehicle cell and for the connection to the steering column are symmetrical to the geometrical central point of the cross member, which central point is situated on a parallel line to the vehicle longitudinal axis and perpendicularly above said longitudinal axis. Depending on the steering arrangement provided for a vehicle being assembled, a point-assembled cross member of this type can be installed either rotated through 180° about its vertical axis intersecting the geometrical central point of the cross member or—with the same effect—rotated through 180° about its longitudinal axis which likewise intersects the geometrical central point of the cross member and runs parallel to the vehicle transverse axis. As also in the case of the above-described cross member according to the invention, the attachment points for the connection to a vehicle cell and for the connection to a steering column are situated at a required points in each variant of the steering. A cross member of this type likewise simplifies keeping it in stock and reduces the outlay on assembly.

It is also conceivable that by means of—advantageously symmetrical—intermediate pieces which can be attached to the longitudinal ends of the cross member, the cross member can be used not only for different steering arrangements of a vehicle but also for different vehicle widths.

In the region of the attachment point for the connection to a steering column, the cross member preferably has a bulge in the direction of the vehicle upper side, with the result that a clearance for receiving the steering column and associated add-on parts is obtained. Since for a steering wheel to be able to be controlled well and also for a low risk of injury in the event of an accident it is not possible for the steering column to be installed into the vehicle at any desired angle, an above-described bulge makes it possible for the cross member to be installed more freely and better corresponding to stability requirements. It is of particular advantage if the cross member has an attachment point which is eccentric to the vehicle longitudinal axis, lies opposite the attachment point for the connection to a steering column and is intended for the connection to an airbag device. This enables the number of variants and the logistical complexity to be reduced further. Moreover, it is particularly favorable if, in the region of the attachment point for the connection to an airbag device, the cross member has a bulge in the direction of the vehicle lower side. An installed airbag device then does not form a protruding component of the assembly and, as a result, the assembly according to the invention is more compact and offers greater freedom in terms of design as regards its covering by, for example, a dashboard.

The cross member of an assembly according to the invention is particularly versatile if it has further attachment points for the connection to add-on parts. An example of one thing to do would be to provide a connecting point for a support for a center console. The support, which is used to reinforce the center console, is connected to the cross member or is omitted depending on the vehicle type and equipment. For example, a support is necessary if a large number of built-in devices, for example an air-conditioning system or an audio-video device, are to be accommodated in the center console. In contrast, a support of this type is unnecessary if—for example in construction site vehicles or passenger vehicles having simple equipment—only a radio device is to be installed, which does not substantially affect the stability of the center console. According to the invention, the same cross member can be used for these different applications. Further attachment points, which can preferably be provided on the cross member, are concerned with providing a connection to a vehicle central electronic unit and/or to an air-conditioning device and/or dashboard and/or pedal unit and/or to a splashboard. It is all the more favorable in this case the more these attachment points, which are occasionally required, are provided on the cross member, since this enables the outlay on manufacture and storage to be reduced considerably. The splashboard, which closes off an assembly according to the invention in the direction of the vehicle front side or of an engine compartment, can additionally be connected, increasing the stability, to components which can be attached to the cross member, such as, for example, the pedal unit.

To minimize the vehicle weight it is of advantage if the cross member is made of aluminum or an aluminum alloy. However, it is even more favorable if the cross member is made of magnesium or a magnesium alloy since magnesium has a considerably higher strength than aluminum at a comparable specific weight. A clear reduction in weight of the cross member can also be achieved if the member is not designed as a solid component but is preferably a framework consisting of panels between at least two shells. With a suitably designed framework, high stability with a simultaneous reduction in weight can be achieved. The design is simple but just as minimizing in terms of weight if the cross member is advantageously a plane load-bearing structure. With respect to the loads which occur and to the desired attachment of further components to the cross member, the panels and/or shells of the plane load-bearing structure are then preferably aligned approximately in the direction of the vehicle vertical axis, slight deviations from the perpendicular position being able to increase the stability depending on the load in each case.

Depending on the manufacturing possibilities which are present, it is of advantage if the cross member is a welded component or—considerably reducing the number of manufacturing steps—a cast component.

Particularly when attachment points of the cross member for the connection to further components are complex to design, it may be of advantage if the cross member and at least some of the attachment points are connected detachably to one another so that they only have to be joined if the need arises. The cross member and at least some of the attachment points are then preferably screwed to one another.

In contrast, in accordance with simplifying production to the greatest possible extent, it is particularly favorable if the cross member and at least some of the attachment points are connected nondetachably to one another. The cross member and at least some of the attachment points can then advantageously be welded or bonded to one another. However, the number of components is considerably reduced if at least some of the attachment points are recesses in or projections on the cross member. For example, one thing to do would be to cast these attachment points in one process step together with the cross member, if the latter is a cast component. The cross member itself can be connected to the vehicle cell and/or to the steering column in any desired manner, but it is particularly advantageous if the cross member is screwed to the vehicle cell and/or to the steering column so that the assembly according to the invention having the cross member and the further add-on parts can be prefabricated before it is connected as a complete unit to the vehicle cell and the steering column. Weldings in the direct vicinity of highly sensitive components, such as, for example, a vehicle central electronic unit or an airbag device, can then be omitted.

BRIEF DESCRIPTION OF THE DRAWINGS

The invention is explained in more detail below with reference to exemplary embodiments illustrated in the attached drawings, in which.

DETAILED DESCRIPTION OF THE PREFERRED EMBODIMENT

Figure 1:
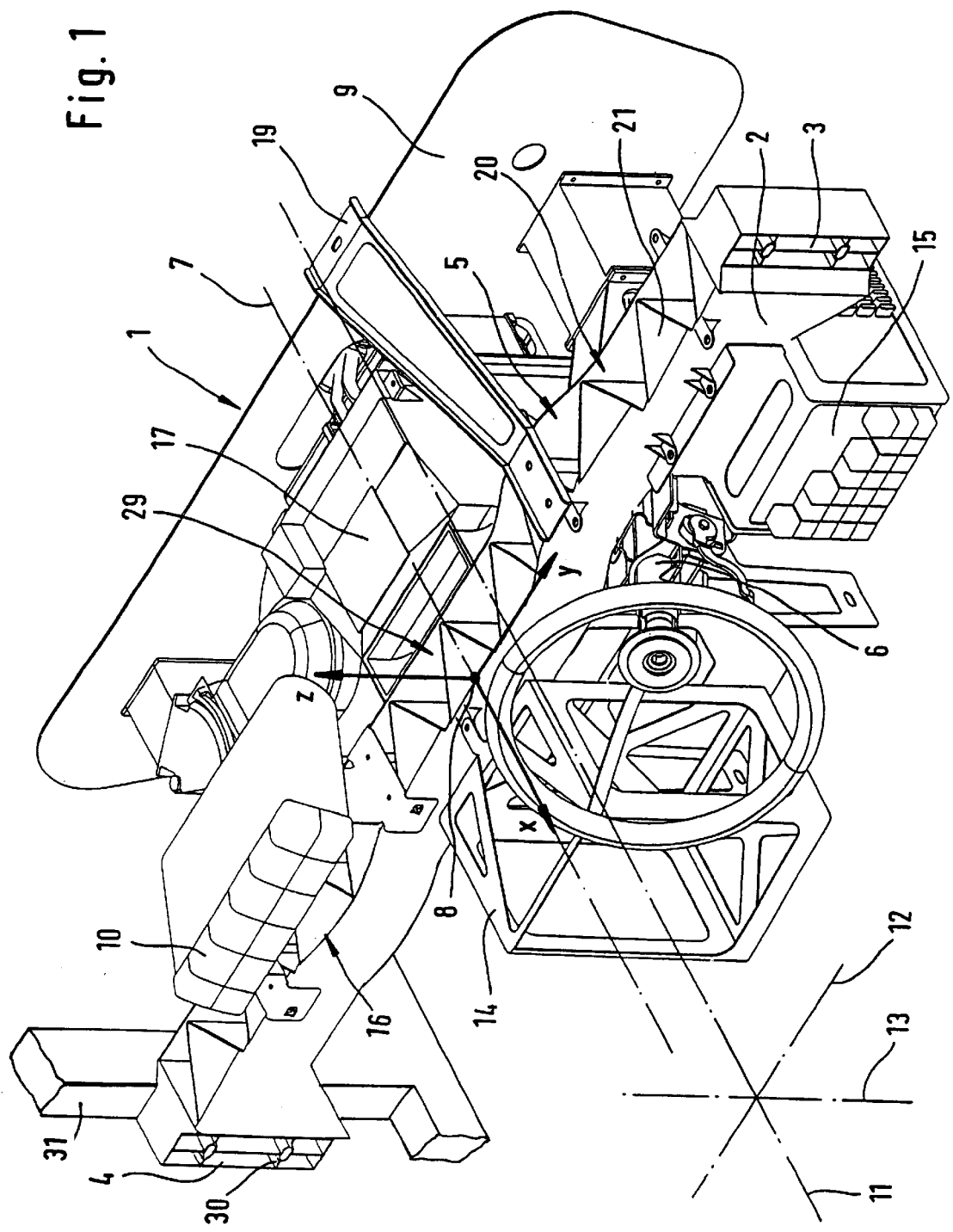
FIG. 1 shows an assembly according to the invention for a cockpit area of a vehicle having right-hand drive, in a perspective view.

The assembly 1 represented in FIG. 1 for a cockpit area of a right-hand drive motor vehicle has a cross member 2 and a splashboard 9 which is connected to said cross member by means of a strut 19 and has further add-on parts.

To clarify the installation positions of the various components, a vehicle longitudinal axis 11, a vehicle transverse axis 12 and a vehicle vertical axis 13 of the motor vehicle associated with the assembly 1 and not shown here are drawn in FIG. 1, as is the geometrical central point 8 of the cross member 2. In the geometrical central point 8, which is situated perpendicularly above the vehicle longitudinal axis 11 and is intersected by a parallel line 7 to the vehicle longitudinal axis 11, there is situated the point of origin of the cross-member system of coordinates 29.

Figure 2:
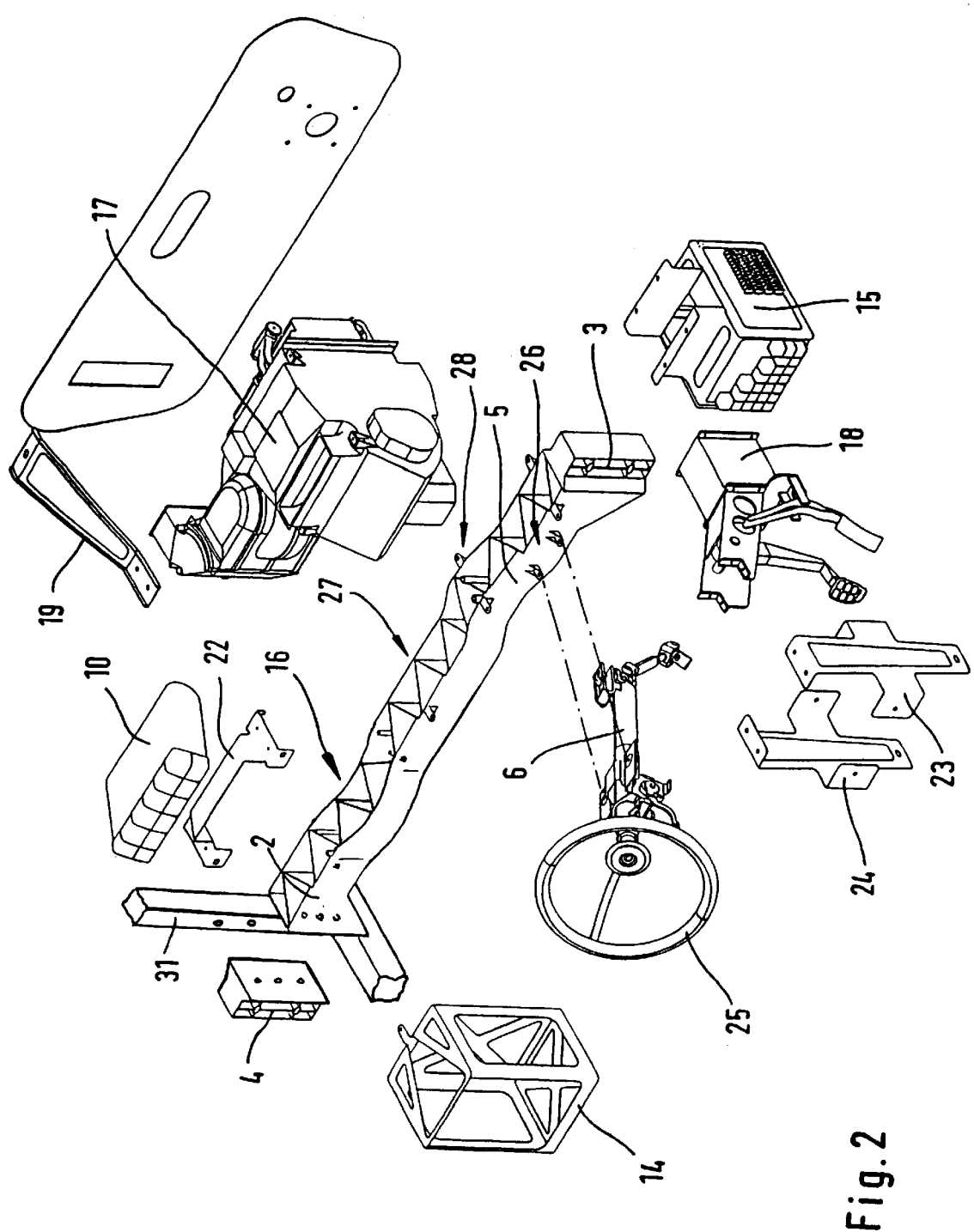
FIG. 2 shows the assembly from FIG. 1 in an exploded representation.

Attachment points 3 and 4 of the cross member 2 are used or a right-hand side and left-hand side connection, respectively, of the member 2 to a vehicle cell 31, and at an attachment point 5 a steering column 6 is connected to a steering wheel 25 (FIG. 2). It is particularly favorable if the cross member 2 is screwed to the vehicle cell 31 and/or to the steering column. The portion of the vehicle cell near attachment point 4 is shown. The cross member 2, the attachment points 3, 4 for the connection to the vehicle cell 31 and the attachment point 5 for the connection to the steering column 6 are symmetrical to the longitudinal central plane of the cross member, i.e. to the yz plane of the system of coordinates 29.

On the left-hand side, in an attachment point 16, a front-passenger airbag device 10 is fastened to the cross member 2 by means of a retaining device 22 (FIG. 2) and on the right-hand side a central electronic unit 15 is installed. Centrally, in the region of the vehicle longitudinal axis 11, there is situated a support 14 for a center console (not shown) —as well as a dashboard covering off the assembly 1 from a passenger compartment—and also for a heating and air-conditioning device 17.

The cross member 2 is designed as a plane load-bearing structure 20 which consists of panels 21 essentially aligned approximately vertically. In the region of the attachment points 3, 4 for the connection to a vehicle cell, for rigidity reasons (defining of attachment locations) some approximately horizontally aligned panels 30 are provided. It is particularly favorable if the cross member 2 consists of a magnesium diecasting since it thereby has a high strength with a nevertheless low inherent weight.

FIG. 2 shows the assembly 1 from FIG. 1 in an exploded representation. Here, as also in the following text, identical parts are provided with the same reference numbers. Tunnel struts 23, 24 for the connection to a vehicle center tunnel are connected to the cross members 2, in the central region thereof, at an attachment point (not visible here) on the lower side of the member. If the attachment point, by means of various attachment locations, makes possible different positional requirements for the tunnel struts 23, 24, it is possible for adaptation to various desired center tunnel widths to take place in a simple manner.

A pedal unit 18 is fastened to the member 2 and also—increasing the stability of the assembly 1—to the splashboard 9. Attachment points 26 for the connection to the central electronic unit 15, 27 for the connection to the support 14 for the center console and 28 for the connection to the splashboard 9 by means of the strut 19 have the same symmetry as the cross member 2, as can be seen clearly in FIG. 2, just like the other, abovementioned attachment points. Because of this symmetry, the cross member 2 can be used rotated through 180° about its vertical axis, i.e. the z axis of the system of coordinates 29, for a left-hand drive motor vehicle.

Figure 3:
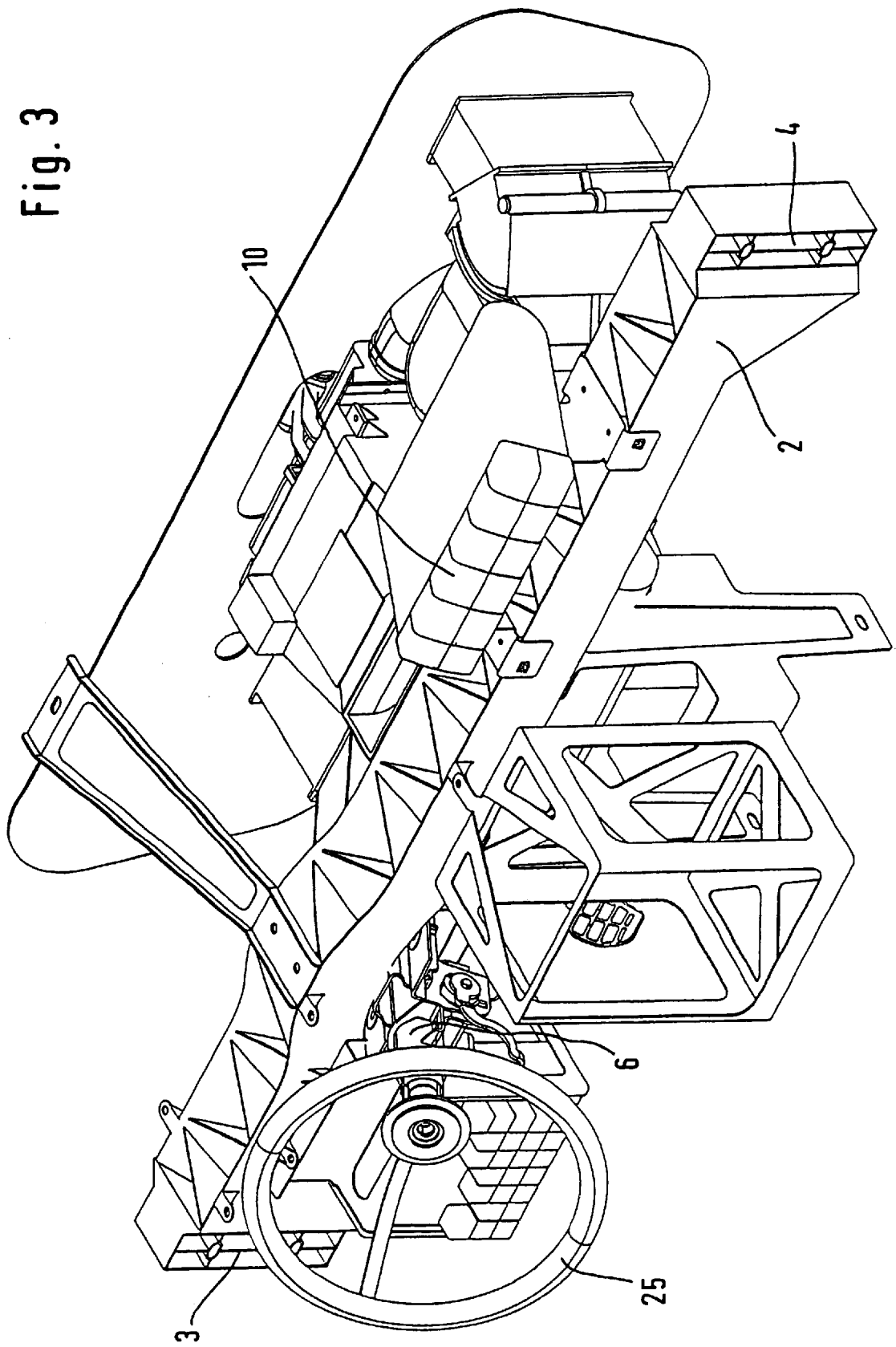
FIG. 3 shows an assembly according to the invention for a cockpit area of a vehicle having left-hand drive, in a perspective view.
Figure 4:
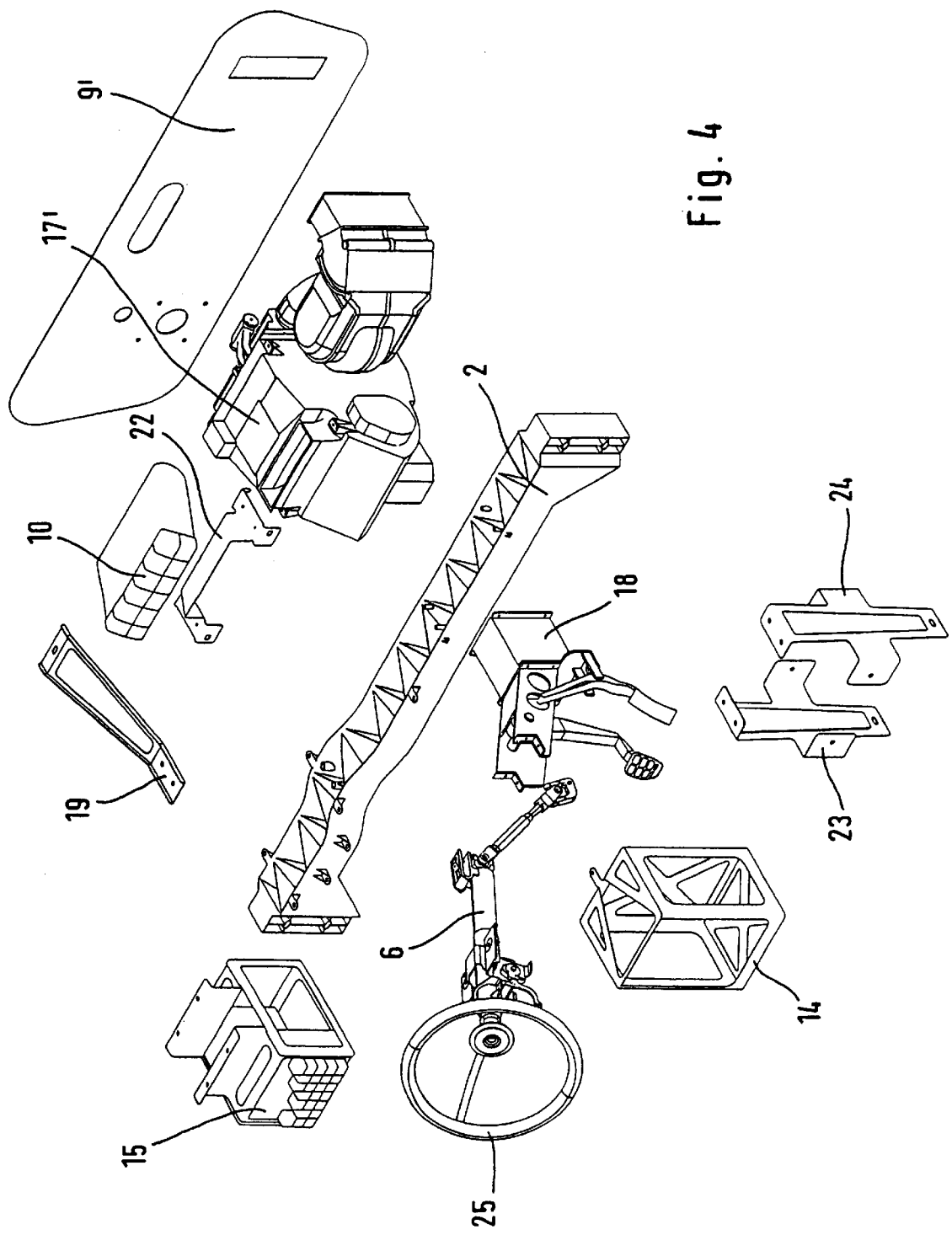
FIG. 4 shows the assembly from FIG. 3 in an exploded representation.

A corresponding representation of an assembly for the cockpit area of a left-hand drive motor vehicle is shown in FIGS. 3 and 4. It can be seen that not only the cross member 2 but also numerous components, such as, for example, airbag device 10, central electronic unit 15 or center console support 14 can be used for both steering variants. In contrast, other components require some modifications in order to be able to used in the left-hand drive vehicle. These include a heating and air-conditioning device 17' and a splashbord 9'. The essential units in the engine compartment of a motor vehicle are arranged at the same position in right-hand and left-hand drive vehicles. Since the splashboard has recesses for connections to units in the engine compartment of the vehicle and also connection points for components arranged in the engine compartment, symmetry in the case of the splashboard can only be realized with limitations. However, it is advantageous if the units are arranged in such a manner that the splashboard can be of symmetrical design and can be used both for right-hand and also for left-hand drive vehicles.

What is claimed is:

1. An assembly for a cockpit area of a vehicle, having a cross member (2) extending approximately over the width of a vehicle interior, the cross member (2) having attachment points (3, 4) at the end regions of said cross member (2) for connection to a vehicle cell (31) and an attachment point (5) which is eccentric to a vehicle longitudinal axis (11), for connection to a steering column (6), wherein the cross member (2) and the attachment points (3, 4, 5) form a constructional unit, and wherein an external shape of the cross member (2) and the attachment points (3, 4, 5) for connection to the vehicle cell (31) and for connection to the steering column (6) are symmetrical to a longitudinal central plane of the cross member (2), the longitudinal central plane of the cross member (2) being that plane which extends vertically and in direction of a vehicle transverse axis (12) and which intersects a geometrical central point (8) of the cross member (2), which central point (8) is situated on a parallel line (7) to the vehicle longitudinal axis (11) and perpendicularly above said longitudinal axis (11).

2. The assembly as claimed in claim 1, wherein the external shape of the cross member (2) and the attachment points (3, 4, 5) for connection to the vehicle cell (31) and for connection to the steering column (6) are symmetrical to a plane which extends longitudinally and in direction of the vehicle transverse axis and which intersects the geometrical central point (8).

3. The assembly as claimed in claim 1, wherein, in region of the attachment point (5) for connection to said steering column (6), the cross member (2) has a bulge in direction of a vehicle upper side.

4. The assembly as claimed in claim 1, wherein the cross member (2) has an attachment point (16) which is eccentric to the vehicle longitudinal axis (11), lies opposite the attachment point (5) for connection to said steering column (6) and is intended for connection to an airbag device (10).

5. The assembly as claimed in claim 4, wherein, in region of the attachment point (16) for connection to said airbag device (10), said cross member (2) has a bulge in direction of a vehicle lower side.

6. The assembly as claimed in claim 1, wherein the cross member (2) has attachment points for connection to a support (14) for a center console, or a vehicle electronic unit (15) or an air-conditioning device (17) or a dashboard or a pedal unit (18) or a splashboard (9).

7. The assembly as claimed in claim 1, wherein said cross member (2) comprises aluminum or an aluminum alloy.

8. The assembly as claimed in claim 1, wherein said cross member (2) comprises magnesium or a magnesium alloy.

9. The assembly as claimed in claim 1, wherein said cross member (2) is a framework.

10. The assembly as claimed in claim 1, wherein said cross member (2) is a plane load-bearing structure (20).

11. The assembly as claimed in claim 10, wherein the panels (21) or shells of the plane load-bearing structure (20) are aligned approximately in direction of a vehicle vertical axis (13).

12. The assembly as claimed in claim 1, wherein said cross member (2) is a welded component.

13. The assembly as claimed in claim 1, wherein said cross member (2) is a cast component.

14. The assembly as claimed in claim 1, wherein the cross member (2) and at least some of the attachment points (3, 4, 5, 16) are connected detachably to one another.

15. The assembly as claimed in claim 14, wherein said cross member (2) and at least some of the attachment points (3, 4, 5, 16) are screwed to one another.

16. The assembly as claimed in claim 1, wherein the cross member (2) and at least some of the attachment points (3, 4, 5, 16) are connected nondetachably to one another.

17. The assembly as claimed in claim 16, wherein said cross member (2) and at least some of the attachment points (3, 4, 5, 16) are welded or bonded to one another.

18. The assembly as claimed in claim 16, wherein at least some of the attachment points (3, 4, 5, 16) are recesses in or projections on the cross member (2).

19. The assembly as claimed in claim 1, wherein the cross member (2) is screwed to the vehicle cell (31) or the steering column (6).

20. The assembly as claimed in claim 2, wherein, in region of the attachment point (5) for connection to said steering column (6), the cross member (2) has a bulge in direction of a vehicle upper side.

21. The assembly as claimed in claim 2, wherein the cross member (2) has an attachment point (16) which is eccentric to the vehicle longitudinal axis (11), lies opposite the attachment point (5) for connection to said steering column (6) and is intended for connection to an airbag device (10).

22. The assembly as claimed in claim 21, wherein, in region of the attachment point (16) for connection to said airbag device (10), said cross member (2) has a bulge in direction of a vehicle lower side.

23. The assembly as claimed in claim 2, wherein the cross member (2) has attachment points for connection to a support (14) for a center console, or a vehicle electronic unit (15) or an air-conditioning device (17) or a dashboard or a pedal unit (18) or a splashboard (9).

24. The assembly as claimed in claim 2, wherein said cross member (2) comprises aluminum or an aluminum alloy.

25. The assembly as claimed in claim 2, wherein said cross member (2) comprises magnesium or a magnesium alloy.

26. The assembly as claimed in claim 2, wherein said cross member (2) is a framework.

27. The assembly as claimed in claim 2, wherein said cross member (2) is a plane load-bearing structure (20).

28. The assembly as claimed in claim 27, wherein the panels (21) or shells of the plane load-bearing structure (20) are aligned approximately in direction of a vehicle vertical axis (13).

29. The assembly as claimed in claim 2, wherein said cross member (2) is a welded component.

30. The assembly as claimed in claim 2, wherein said cross member (2) is a cast component.

31. The assembly as claimed in claim 2, wherein the cross member (2) and at least some of the attachment points (3, 4, 5, 16) are connected detachably to one another.

32. The assembly as claimed in claim 31, wherein the cross member (2) and at least some of the attachment points (3, 4, 5, 16) are screwed to one another.

33. The assembly as claimed in claim 2, wherein the cross member (2) and at least some of the attachment points (3, 4, 5, 16) are connected nondetachably to one another.

34. The assembly as claimed in claim 33, wherein the cross member (2) and at least some of the attachment points (3, 4, 5, 16) are welded or bonded to one another.

35. The assembly as claimed in claim 33, wherein at least some of the attachment points (3, 4, 5, 16) are recesses in or projections on the cross member (2).

36. The assembly as claimed in claim 2, wherein the cross member (2) is screwed to the vehicle cell (31) or the steering column (6).

37. The assembly as claimed in claim 1, wherein the vehicle is a motor vehicle.

\* \* \* \* \*